(12) United States Patent
Druch et al.

(10) Patent No.: US 9,378,008 B2
(45) Date of Patent: Jun. 28, 2016

(54) METHOD AND SYSTEM FOR CREATING, APPLYING, AND REMOVING A SOFTWARE FIX

(75) Inventors: Ian Druch, San Francisco, CA (US); Sujatha Srinivasa Gopalan, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1125 days.

(21) Appl. No.: 12/973,713

(22) Filed: Dec. 20, 2010

(65) Prior Publication Data

US 2012/0159463 A1 Jun. 21, 2012

(51) Int. Cl.
*G06F 9/445* (2006.01)

(52) U.S. Cl.
CPC .................................. *G06F 8/67* (2013.01)

(58) Field of Classification Search
CPC ... G06F 8/30; G06F 11/3604; G06F 11/3636; G06F 8/443
USPC ........................................................ 717/140
See application file for complete search history.

(56) References Cited

U.S. PATENT DOCUMENTS

| | | | | |
|---|---|---|---|---|
| 5,949,972 A * | 9/1999 | Applegate | ........................ | 714/54 |
| 6,202,207 B1 * | 3/2001 | Donohue | ........................ | 717/173 |
| 7,810,087 B2 * | 10/2010 | O'Brien | ........................ | 717/168 |
| 2003/0101431 A1 * | 5/2003 | Duesterwald et al. | ........ | 717/111 |
| 2004/0205744 A1 * | 10/2004 | Chang | ........................ | 717/168 |
| 2006/0005169 A1 * | 1/2006 | Berstis et al. | ................. | 717/125 |
| 2006/0277541 A1 * | 12/2006 | Sproul | ................ | G06F 9/44557 717/174 |
| 2007/0192623 A1 * | 8/2007 | Chandrasekaran | ........... | 713/189 |
| 2009/0157766 A1 * | 6/2009 | Shen et al. | ..................... | 707/202 |
| 2009/0172631 A1 * | 7/2009 | Zunke et al. | .................. | 717/100 |
| 2010/0180265 A1 * | 7/2010 | Tsai | ...................... | G06F 9/4426 717/140 |
| 2012/0239869 A1 * | 9/2012 | Chiueh et al. | ................. | 711/103 |

* cited by examiner

*Primary Examiner* — Chat Do
*Assistant Examiner* — Sergio J Curbelo, III
(74) *Attorney, Agent, or Firm* — Shun Yao; Park, Vaughan, Fleming & Dowler LLP (57) ABSTRACT

Embodiments of the present disclosure involve a method for creating, applying, and removing a software fix for an application without terminating the application. To create the fix, the system converts an unresolved internal reference in a source code section to an external imported reference, generates a header file which includes a re-definition of the external imported reference, and generates a binary representation for the fix by compiling the source code section using the generated header file and linking the complied object. To apply the fix, the system loads the binary representation into a virtual address space, places a long jump operator in a compiler-generated padding prior to the start of an affected function, and replaces a no-operation prologue at the start of the function with a short jump operator in an atomic write operation. To remove the fix, the system replaces the short jump operator with the no-operation prologue, removes the long jump operator, and unloads the software fix.

13 Claims, 12 Drawing Sheets

HEADER FILE
220

```
// myfix.h – the header file for the DLL define EXPORT extern __declspec (dllexport)
EXPORT myFix(int);
```

CONVERTED
SOURCE FILE
240

```
// myfix.cpp – the source file for the DLL

/* automatically generated header file foo.h supersedes all
other header files, e.g. myfix.h */
#include "foo.h"
#include "myfix.h";

int DllMain () {
        return 1;
};

myFix (int i) {
        i++;
        foo1();
        ...
};
```

GENERATED
HEADER FILE
260

```
// foo.h – the automatically generated header file define foo1_ (*foo1_)
define foo2_ (*foo2_)
#define foo3_ (*foo3_)
#define foo4_ (*foo4_)
#define foo5_ (*foo5_)
```

ORIGINAL EXPORT TABLE 500

```
   1 ordinal base
 244 number of functions
 244 number of names ordinal hint RVA      name
    1   0 0645EC04 function1
    2   1 0645ECAA function2
    3   2 0645C7C6 function 3
    4   3 0645C69E function 4
    5   4 0645C3C2 function 5
   ... ...
  240  EF 05B5787A bar1
  241  F0 05B5A246 bar2
  242  F1 05B5915C bar3
  243  F2 05B5731C bar4
  244  F3 05B59D76 bar5
```

FIG. 5A

MODIFIED EXPORT TABLE 550

```
   1 ordinal base
 249 number of functions
 249 number of names ordinal hint RVA      name
    1   0 0645EC04 function1
    2   1 0645ECAA function2
    3   2 0645C7C6 function3
    4   3 0645C69E function4
    5   4 0645C3C2 function5
   ... ...
  240  EF 05B5787A bar1
  241  F0 05B5A246 bar2
  242  F1 05B5915C bar3
  243  F2 05B5731C bar4
  244  F3 05B59D76 bar5
  245  F4 0705618A foo1_
  246  F5 07057208 foo2_
  247  F6 07057210 foo3_
  248  F7 0705721C foo4_
  249  F8 07088ee8 foo5_
```

EXTENDED EXPORT TABLE ENTRIES 580

FIG. 9

METHOD AND SYSTEM FOR CREATING, APPLYING, AND REMOVING A SOFTWARE FIX

BACKGROUND

1. Field

The present disclosure relates software fixes. More specifically, the present invention relates to a method and system for creating, applying, and removing a software fix.

2. Related Art

Often times, publicly released software applications contain errors that negatively affect usability of the software. These software errors can be corrected by applying software fixes. Conventionally, creating a software fix involves re-compiling and re-linking all effected software application components. Moreover, the application of a software fix in the Microsoft Windows® operating system environment typically requires termination or suspension of the execution of the software application prior to replacing the effected software components with new versions containing the software fix. Furthermore, these new versions of application components with the software fix generally cannot be removed without terminating or suspending the application execution. The need to terminate the application execution is especially problematic for software applications requiring 24/7 availability, such as database servers, web server, transaction monitors, etc.

SUMMARY

Embodiments of the present disclosure provide a system and method for creating, applying, and removing a software fix for an application without terminating or suspending the execution of the application. One embodiment of the present disclosure provides a system that converts an unresolved internal reference in a source code section containing the fix to an external imported reference. The unresolved internal reference refers to another source code section, which does not contain the fix. The system then generates a header file, which includes a definition of the external imported reference. The system also generates a binary representation for the fix by compiling the source code section containing the fix using the header file and linking the compiled code.

In a variation of this embodiment, the system recognizes a thread-local storage (TLS) variable when compiling the source code section. The system also generates a new source file that includes a pragma section. The pragma section defines a custom TLS segment in the software fix. The system places an entry associated with the TLS variable in the custom TLS segment at an offset that is identical to the offset associated with the corresponding TLS variable in a TLS segment in the binary code to be fixed. The system next compiles the new source file.

In a variation of this embodiment, the generated header file supersedes any other header file.

In a variation of this embodiment, the system further encapsulates the binary representation with metadata in a secure format. The metadata comprises information on how the application is to be modified to apply the software fix without being terminated or suspended.

In another embodiment of the present disclosure, the system generates an export table in a virtual address space. The export table includes an external export reference, which can be used by a binary representation for the fix. Moreover, the binary representation for the fix contains a corresponding external import reference. The system then loads the binary representation for the fix into the virtual address space, and modifies an existing binary code of a function in the running application, which is affected by the fix. In one embodiment, the system modifies the binary code of the function by placing a long jump operator at the start of the function while storing the existing instructions, thereby transferring the execution to an address in the virtual address space associated with the corresponding fixed function.

In a variation of this embodiment, the system places, in a compiler-generated prologue at the start of the function, a short jump operator directed to the virtual address space location for the long jump operator in a compiler-generated padding, wherein the placement of the short jump operator corresponds to a thread-safe atomic operation and thereby does not require terminating or suspending the application's running threads.

In another variation of the embodiment, the system copies an existing export table in the virtual address space, and modifies the copy of the export table to include the external export reference.

In a further variation, the system assigns the value of a thread-local storage index variable as found in a binary code of the relevant module of the running application to a corresponding thread-local storage index variable in the binary representation for the fix.

In a further variation, the system replaces the long jump operator at the beginning of the function with the originally stored instructions.

In a further variation, the system replaces the short jump operator which is directed at the long jump operator at the beginning of the function with a no-operation prologue in an atomic write operation.

In another variation, the system determines whether any application thread is executing within or returns to a virtual address space occupied by the software fix. If not, the system unloads the software fix from the virtual memory address space.

In another variation, unloading the software fix is performed by a background thread.

In another variation of the embodiment, the system determines that no application thread is executing within or returns to the virtual address space occupied by the software fix by examining a set of logical gates at entry points and exit points of the software fix.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of creating, applying, and removing a software fix in a running software application without interfering with the execution of the application and without using any additional hardware resources is solved.

Specifically, during the creation of the software fix, the present system converts unresolved internal references to another source code section into external imported references, the definition of which is included in a newly generated header file. The system compiles only the source code section containing the fix using the generated header file and links the compiled code to create a binary representation for the software fix.

To apply the software fix, the present system expands an export table of the relevant module in the running application to include entries for external export references, which corresponds to the external imported references defined in the generated header file. The system loads the binary representation of the software fix into a virtual memory space of the running application. The system then modifies the binary code of the application by (1) placing a long jump operator, which is directed to the location of the software fix in the virtual memory space, in a compiler-generated padding before an affected function of the application, and (2) placing a short jump operator, which is directed at the long jump operator, to replace a complier-generated no-operation prologue in the binary code of the affected function.

To remove the software fix, the present system replaces the short jump operator at the start of the affected function with a no-operation prologue in an atomic write operation. The system unloads the software fix from the virtual memory address space after determining that no application thread is executing within or returns to a virtual address space occupied by the software fix.

Creation of Software Application

Figure 1A:
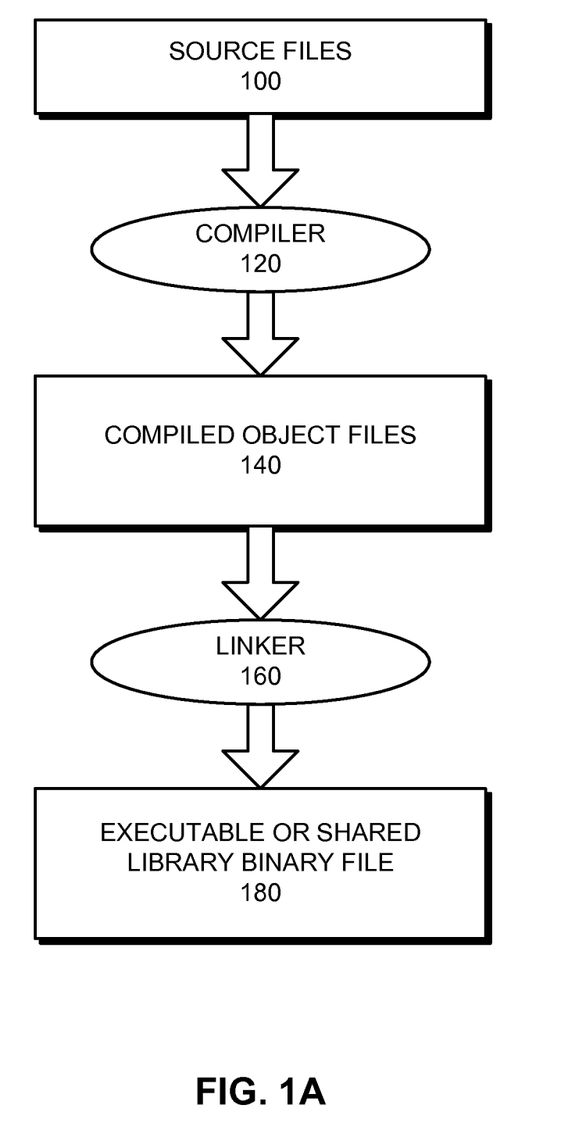
FIG. 1A illustrates creation of an executable or shared library binary file.

FIG. 1A illustrates creation of an executable or shared library binary file. Source files 100 can be any collection of statements or declarations written in a human-readable high-level computer programming language. To transform source files 100 into an executable form, a compiler 120 first compiles them into object files 140. In some embodiments, compiler 120 may insert a no-operation instruction prologue at the start of each function, and a padding before the start of each function, thereby facilitating subsequent application of a software fix during runtime. Object files 140 can then be passed to a linker 160 to generate an executable or a shared library binary file 180. Linker 160 is a program that combines one or more object files generated by compiler 140 into a single binary file 180.

A software application typically comprises several modules, which are contained in multiple object files. Programming code in different modules in different object files may cross-reference each other by means of symbols. There are three common types of reference symbols in an object file: local symbols, export symbols, and import symbols. Local symbols are used internally to reference another function or variable defined within the same object file, and cannot be referenced by functions in another object file. Export symbols (also known as "defined symbols") allow a function or variable to be referenced by a function defined in another object file. Import symbols (also known as "undefined symbols" or "unresolved symbols") allow reference to a function or variable not defined within the same object file.

Shared Library and Dynamic Linking

In a conventional non-shared, static library, sections of code are simply added to the calling program when its executable is built at the linking phrase. Thus, if two programs use the same routine, the code corresponding to the routine would be included in the binary files of both programs.

With dynamic linking, resolving undefined or unresolved symbols is postponed until runtime. Thus, the executable code would still contain undefined or unresolved symbols that refer to functions and variables defined in another module. The executable code would also include a list of shared libraries that provide definitions for these unresolved symbols such that the software application can dynamically load the share libraries into its virtual memory address space at runtime.

Figure 1B:
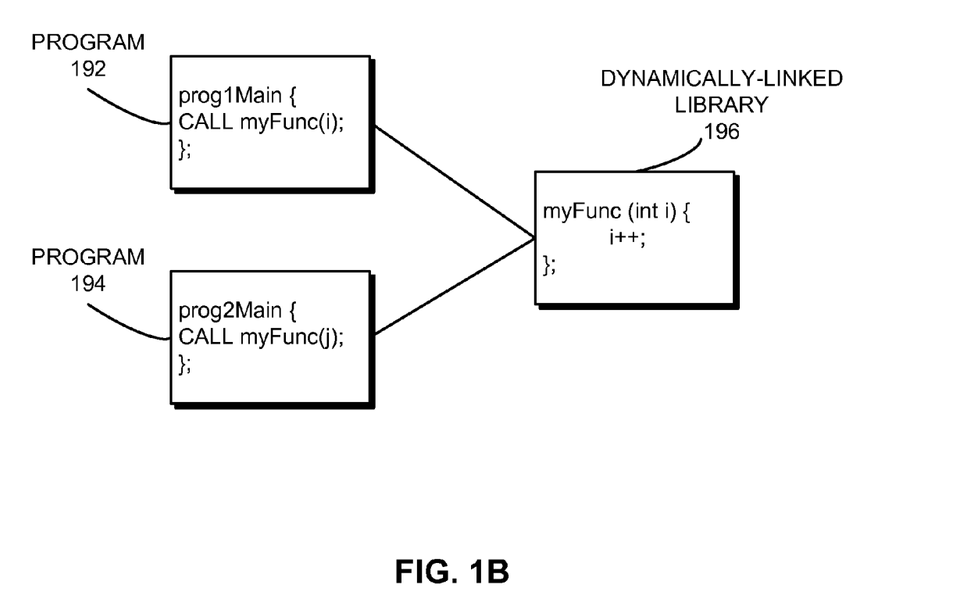
FIG. 1B illustrates a shared library, in accordance with one embodiment of the present disclosure.

FIG. 1B illustrates an exemplary for dynamic linking. In this example, shared code is placed into a single, separate file, i.e., a dynamically-linked library (DLL) 196. Two programs 192 and 194 may call the same function myFunc, which is defined in DLL 196. Rather than duplicating binary code for myFunc in binary codes of both programs 192 and 194, DLL 196 is linked to the binary codes for both programs 192 and 196 during runtime.

Creating Software Fix

Figure 2:
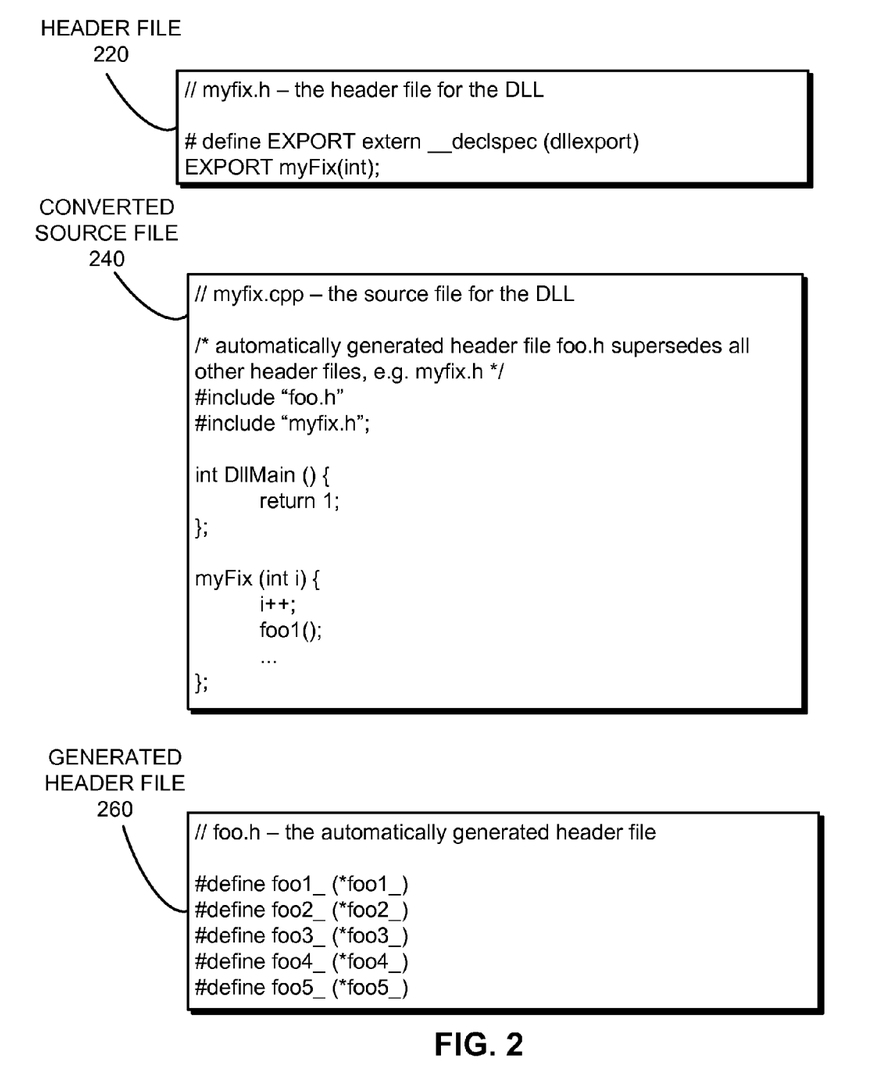
FIG. 2 presents a diagram illustrating the creation of a software fix, in accordance with one embodiment of the present disclosure.

Conventional software fixes include all source codes in an affected module even though some source codes do not involve any code change at all. Unlike conventional software fixes, a software fix in accordance to embodiments of the present disclosure is created through compilation and linking of only source code files containing the fix or code changes. FIG. 2 presents a diagram illustrating the creation of a software fix, in accordance with one embodiment of the present disclosure. The software fix includes one or more header files 220, converted source files 240, and generated header files 260. The conversion of source files 240 and generation of header files 260 are explained in details below.

Because not all source codes are re-compiled and re-linked, some internal references will become unresolved references. Specifically, these unresolved internal references include references from a source code section in the changed source files, which is included in the software fix, to another source code section in the unchanged source files, which is not included in the fix. During creation of the software fix, all unresolved internal references are automatically converted into external imported references. The external import references treat reference symbols as unresolved symbols from external modules and allow these symbols to be resolved at runtime rather than at compilation.

The conversion is performed by creating new definitions for all such unresolved internal references and placing the new definitions in an automatically generated header file 260. Note that the new definition changes the definition from a variable (e.g. foo1_) to a pointer to the variable (e.g., *foo1_). The pointer to the variable points to a location in a virtual memory address space of the software application after the fix function is loaded in the virtual memory address space. The generated header file is then used to compile and link the source code containing the fix into binary form, e.g., a DLL.

Furthermore, header file 260 supersedes all other header files in the source code of the software fix. This assures that the new definitions in header file 260 take priority over all other definitions for the same references in the compile phase. Thus, the linker will not attempt to link to other object files having these reference definitions and corresponding to unchanged source codes. To supersede other header files, a programmer of the software fix may use a compiler option, such as the "force include (/FI)" option provided by a C/C++ compiler. Alternatively, converted source file 240 (e.g., myfix.cpp) of the software fix may be automatically modified to place generated header file 260 (e.g., foo.h) prior to all other header files (e.g., myfix.h). The binary representation of the software fix is then encapsulated with the pertinent metadata in a secure format.

Creating the software fix in Microsoft Windows® environment introduces additional complexity when support for thread-local storage (TLS) variables is required. All threads of a process share its virtual memory address space. The local variables of a function are unique to each thread that runs the function. However, the static and global variables are shared by all threads in the process. Thread local storage (TLS) variables store thread-specific data that the process can access using a global index.

In a natively multi-threaded Microsoft Windows® environment, TLS variables can be instantiated on a per-thread basis either at compile-time via _declspec(thread) optional qualifier or at run-time via TLS Windows Application Programming Interface (TLS API)®. In order to support TLS, any software fix referencing a TLS variable must be able to access the correct instance of the TLS variable in each of the software application's execution threads. TLS variables created through the use of TLS API do not require special handling in the software fix because to the operating system a call to a TLS API function made from the software fix is indistinguishable from a call made from the original binary file containing the effected function that is fixed by the software fix.

Figure 3A:
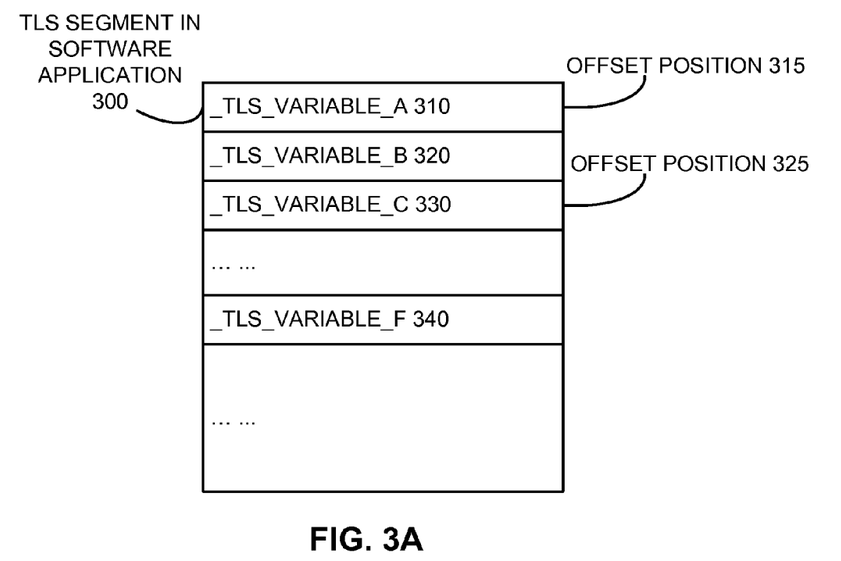
FIG. 3A presents a diagram illustrating a thread-local storage segment in a software application.

However, the more commonly used _declspec(thread) qualifier requires special handling when the software fix is created. FIG. 3A presents a diagram illustrating a thread-local storage segment in a software application. A TLS segment 300 includes TLS variables such as _TLS_VARIABLE_A 310, _TLS_VARIABLE_B 320, _TLS_VARIABLE_C 330 . . . _TLS_VARIABLE_F 340, etc. Note that different TLS variables are placed at different offsets within the TLS segment. For example, _TLS_VARIABLE_A 310 is placed at offset position 315 in segment 300, and _TLS_VARIABLE_C 330 is placed at offset position 325 in segment 300.

Figure 3B:
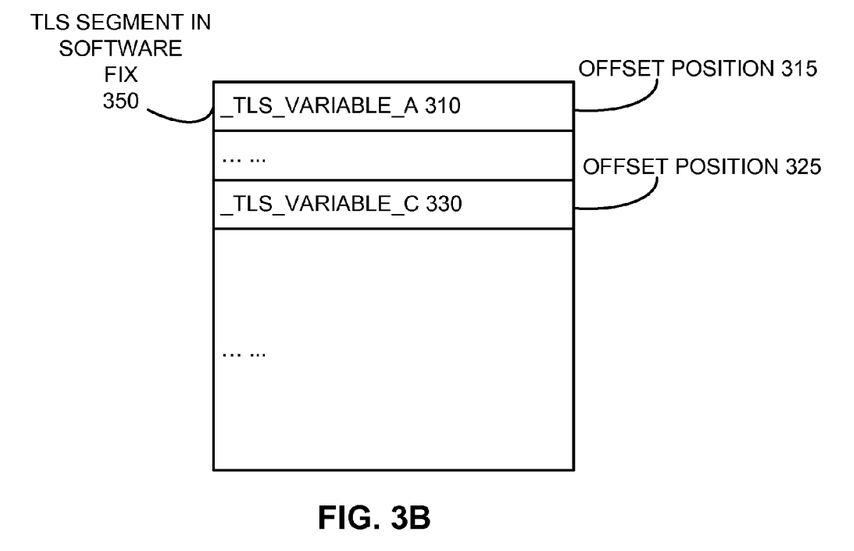
FIG. 3B presents a diagram illustrating a thread-local storage segment in the software fix, in accordance with one embodiment of the present disclosure.

FIG. 3B presents a diagram illustrating a thread-local storage segment in the software fix, in accordance with one embodiment of the present disclosure. In order to de-reference _declspec(thread) variables in the software fix to their proper locations in the virtual memory address space, when the software fix is built, a custom TLS segment is created using the #pragma section compiler directive. A TLS segment for the software fix 350 includes only TLS variables that are referenced in the software fix, e.g., _TLS_VARIABLE_A 310 and _TLS_VARIABLE_C 330. Moreover, the referenced TLS variables are placed in an order and at an offset identical to the TLS segment for the software application 300. That is, _TLS_VARIABLE_A 310 is placed at offset position 315 and _TLS_VARIABLE_C 330 is placed at offset position 325 in the TLS segment for software fix 350. TLS variables not referenced in the software fix do not need to be included in the TLS segment in software fix 350.

To resolve TLS variables during loading time of the software fix, TLS segment 350 is aliased to TLS segment 300. The _tls_index variable in the software fix is assigned the same value of the corresponding _tls_index variable from the relative module of the software application. Therefore, all references to TLS variables in the software fix are de-referenced to their correct locations in the virtual memory address space of the application. With this approach, the resolution of TLS variables during the application of the fix is instantaneous and has no adverse impact on system performance.

Figure 4A:
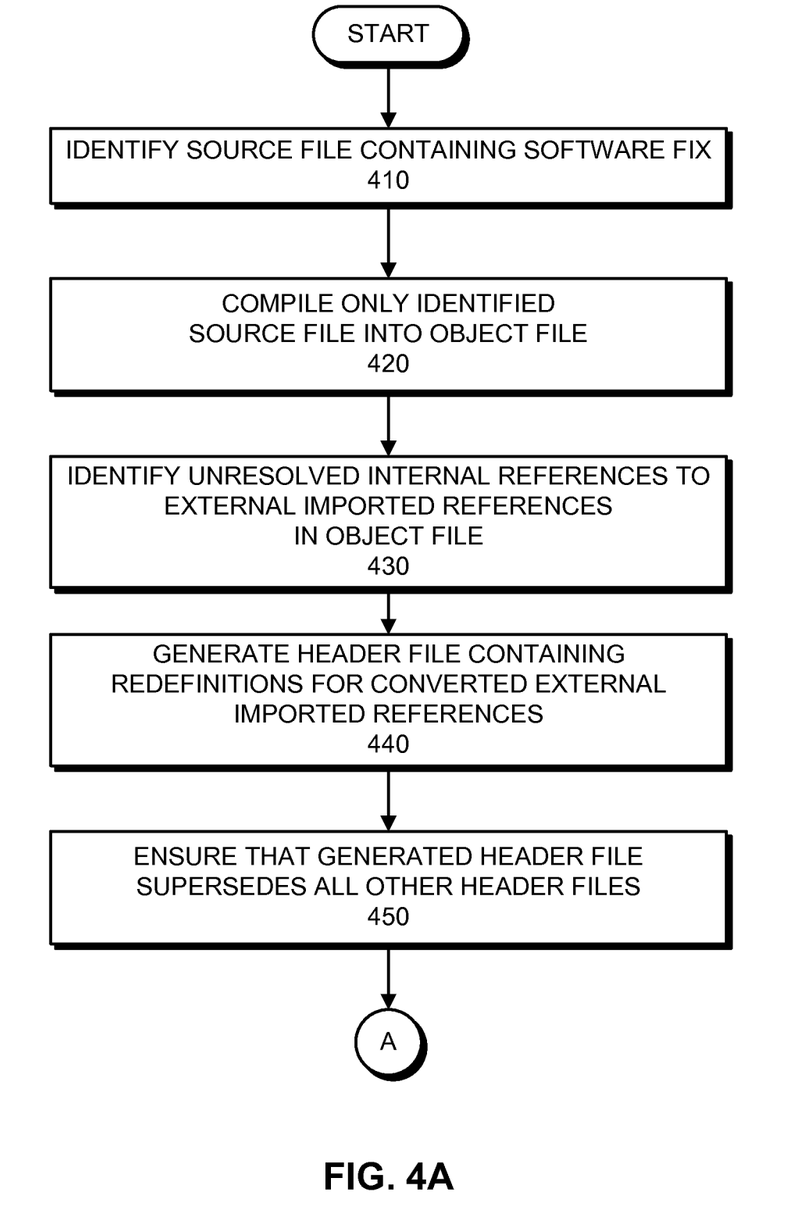
FIGS. 4A and 4B present flowcharts illustrating the process of creating a software fix, in accordance with one embodiment of the present disclosure.
Figure 4B:
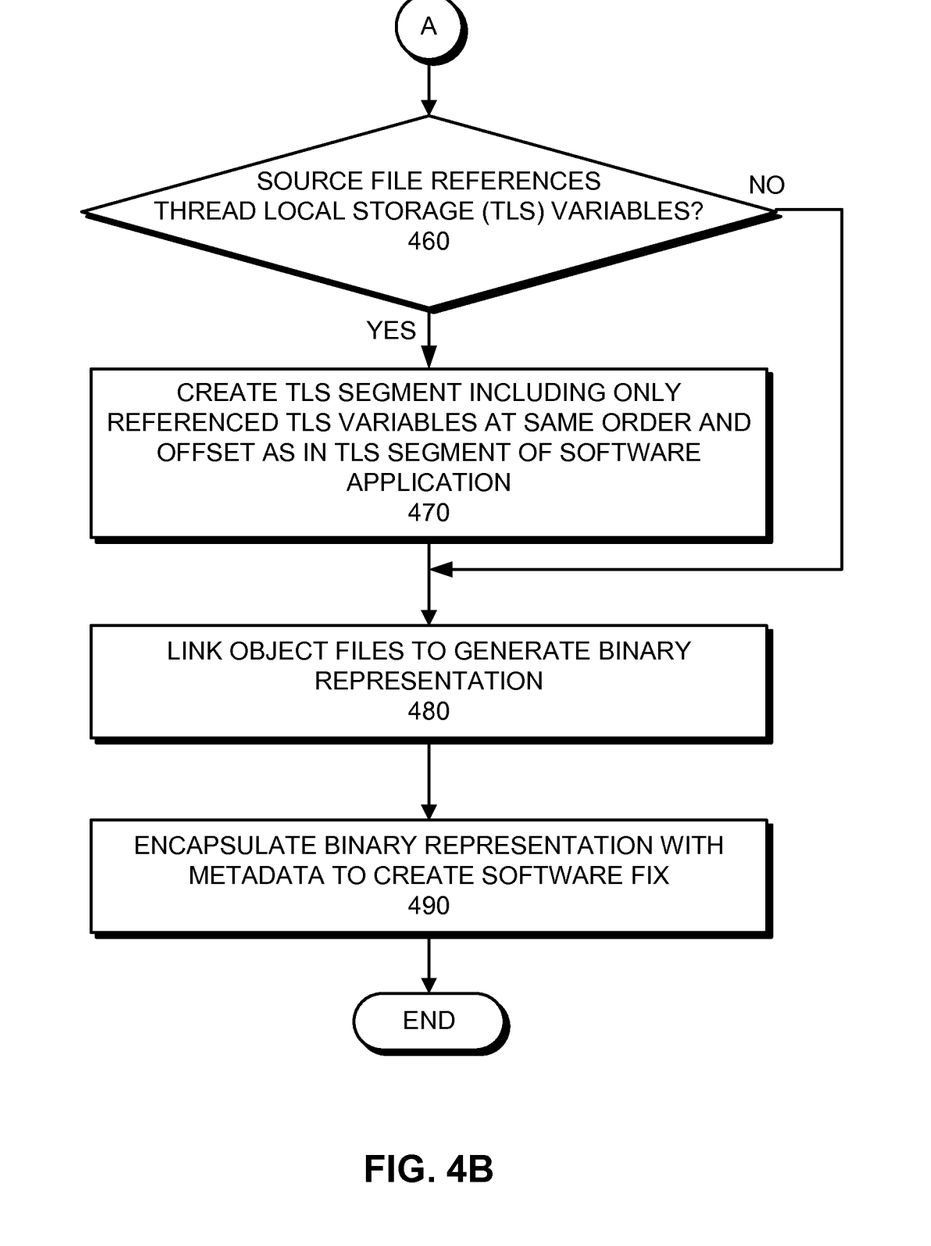

FIGS. 4A and 4B present flowcharts illustrating the process of creating a software fix, in accordance with one embodiment of the present disclosure. As illustrated in FIG. 4A, during operation, the system begins by identifying one or more source files containing the software fix (operation 410). Then, the system compiles the identified source files into object files (operation 420). Next, the system converts unresolved internal references to external imported references (operation 430). Note that only source files containing changed source codes in a module affected by the software fix are compiled. Other source files in the same module with unchanged source code are not compiled. The unresolved internal references are those references from one source code section in the software fix to another source code section, which is within the same module as the software fix but is not compiled. Recall that external imported references treat reference symbols as unresolved symbols from external modules and allow these symbols to be resolved at runtime rather than at compilation.

The system generates a header file containing re-definitions for converted external imported references (operation 440). Furthermore, the system ensures that the generated header file supersedes all other header files (operation 450).

Continuing on FIG. 4B, the system then determines whether source files in the software fix contain reference to TLS variables (operation 460). As discussed above, only TLS variables instantiated via the _declspec(thread) optional qualifier during compilation require special handling during the creation of the software fix. If such TLS variables are referenced in the source files, the system creates a custom TLS segment in the software fix (operation 470). Note that the TLS variables in the custom TLS segment of the software fix are placed in the same order and at the same offset as their corresponding TLS variables in the TLS segment of the software application. The system then links the object file using the generated header file to generate a binary representation (operation 480), and encapsulates the binary representation with metadata to create the software fix (operation 490). The metadata comprises information on how the application is to be modified to apply the software fix without being terminated or suspended.

Applying Software Fix

To apply the fix to a running application, the binary representation of the fix and its associated metadata are extracted from secure encapsulation. Based on the extracted metadata, the running application is modified so that the export table of the relevant module contains all references in the generated header file. An export table contains the name of every function that the executable module (DLL or EXE) exports to other executables. These functions are the entry points into the executable module. Thus, only the functions in the exports table can be accessed by other executables. Any other functions in the executable module are private to the executable module.

Figure 5A:
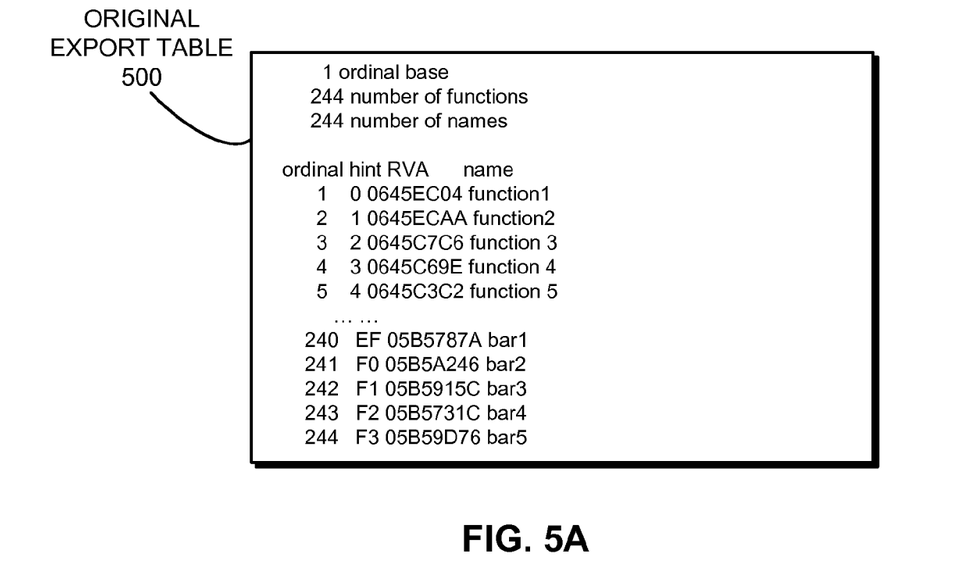
FIG. 5A presents a diagram illustrating an exemplary export table.
Figure 5B:
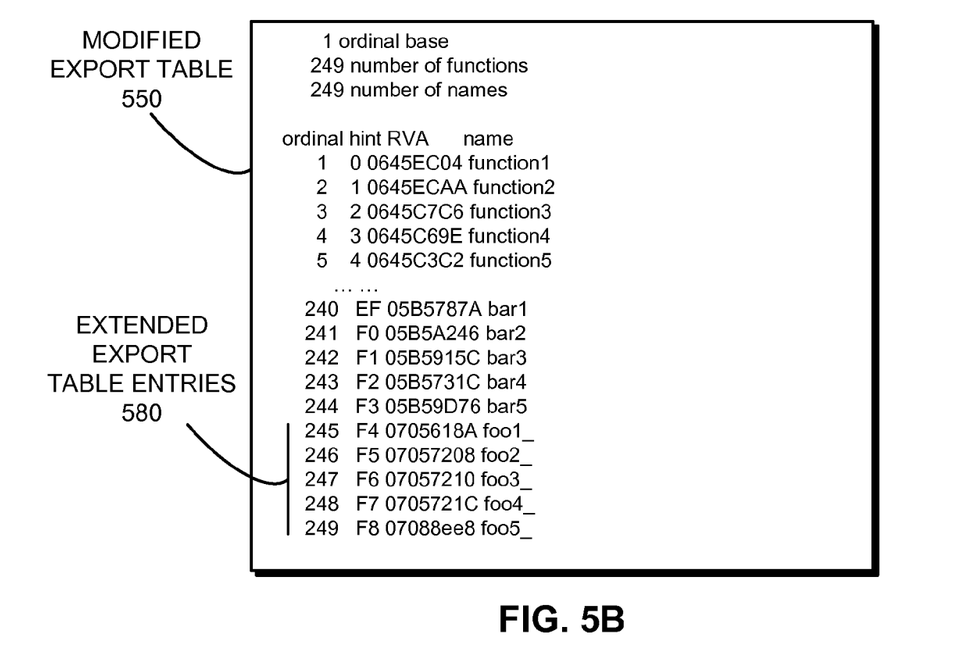
FIG. 5B presents a diagram illustrating an exemplary modified export table, in accordance with one embodiment of the present disclosure.

FIG. 5A presents a diagram illustrating an exemplary original export table 500 of a software application. In this example, export table 500 contains 244 functions and names, each identified by ordinals 1 to 244, respectively. FIG. 5B presents a diagram illustrating an exemplary modified export table 550, in accordance with one embodiment of the present disclosure. With reference to the example illustrated in FIG. 2, the generated DLL header file 260 includes five additional references and names, i.e., foo1_, foo2_, foo3_, foo4_, and foo5, which have been converted from internal references to external imported references. Thus, modified export table 550 has five extended export table entries 580. The five extended export table entries 580 correspond to the five converted references in the generated DLL header file 260. As a result, modified export table 550 now contains 249 functions and names, each identified by ordinals 1 to 249, respectively.

In order to implement the extension described above, the system determines whether the relevant executable module to which the fix is to be applied in the running application has an existing export table. If so, the system can copy the existing export table to another location in the virtual address space and extends the copy to include the additional export table entries. If the relevant executable module in the running application does not have an export table, the system can create a new export table in the virtual address space of the application containing the necessary export entries for the executable module.

The system then installs the software fix and loads the binary representation of the software fix into the virtual address space. The TLS variable resolution is finalized by assigning the value of _tls_index variable referenced in the relevant module of the running application to the _tls_index variable in the software fix. Thus, all references to TLS variables in the custom TLS segment from source code sections within the software fix are now redirected to their correct virtual memory locations.

Figure 6A:
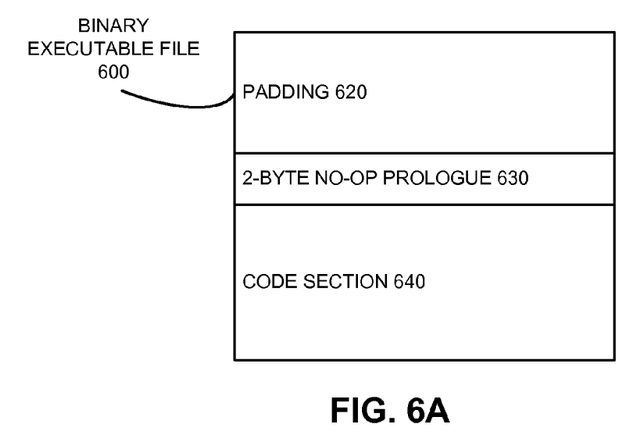
FIG. 6A presents a diagram illustrating an exemplary function in a binary representation of a software fix, in accordance with one embodiment of the present disclosure.

FIG. 6A presents a diagram illustrating an exemplary function in a binary representation of a software fix, in accordance with one embodiment of the present disclosure. In this example, binary executable file 600 of a software fix includes a segment corresponding to a function in the software application. The segment includes a compiler-generated padding 620 which is usually located before the function. Also included is a 2-byte no-operation prologue 630, which is inserted by the compiler when such option is enabled, and a code section 640. Note that an executing thread enters the function at no-operation prologue 630. FIG. 6A is for illustration purpose only. Other sections, such as data section, may also present in the binary code.

The software fix can be applied by modifying the existing binary code of the running functions affected by the fix so that upon entering any such function the execution is immediately transferred via a long jump operator directed to an address in the virtual memory address space into which the software fix is loaded. This address corresponds to the entry point of the function modified by the software fix. However, such modification requires instantaneous suspension of the execution of all running application threads. To alleviate this problem, in some embodiments of the present disclosure, the system modifies the binary executable code by placing a short jump operator in the 2-byte no-operation prologue.

Figure 6B:
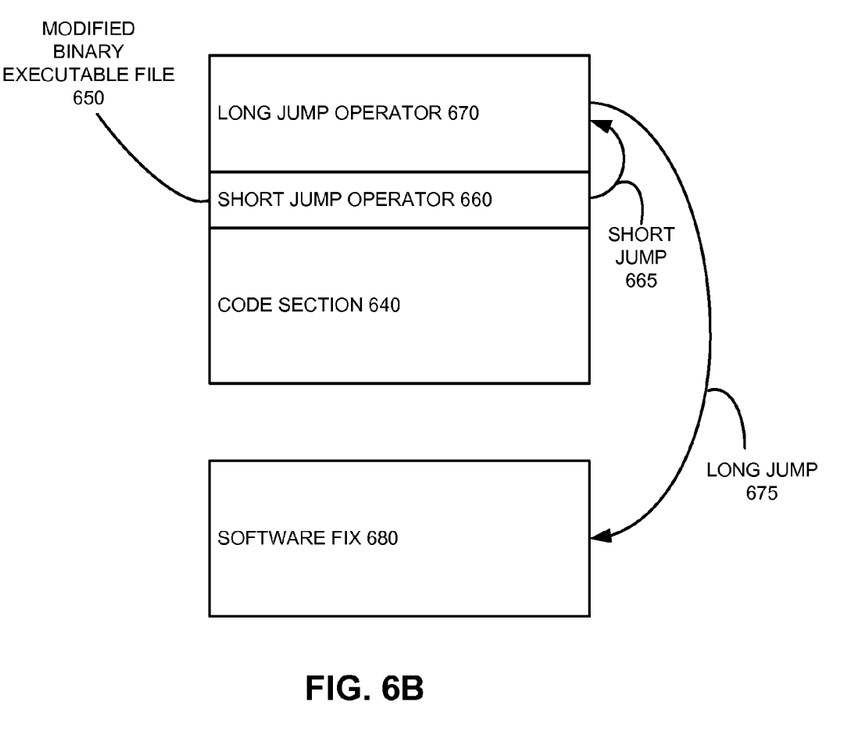
FIG. 6B presents a diagram illustrating an exemplary modified function in an executable software application, with one embodiment of the present disclosure.

FIG. 6B presents a diagram illustrating an exemplary modified function in the executable software application, in accordance one embodiment of the present disclosure. Modified binary executable file 650 includes the same code section 640, a short jump operator 660, and a long jump operator 670. The system places the long jump operator 670 in padding 620 before the function. The long jump operator 670 instructs the application to transfer execution to software fix 680 via a long jump operation 675. Moreover, the system replaces the 2-byte no-operation prologue 630 with the short jump operator 660, which instructs the application to execute the long jump operation as the next instruction via a short jump 665. Because the short jump is a 2-byte instruction, the replacement of 2-byte no-operation instruction with 2-byte short jump instruction can be completed as an atomic instruction within one CPU clock cycle. Therefore, the replacement of 2-byte no-operation instruction with short jump operation is thread-safe. The modification described herein allows for application of the software fix without suspension or termination of the running application.

Figure 7A:
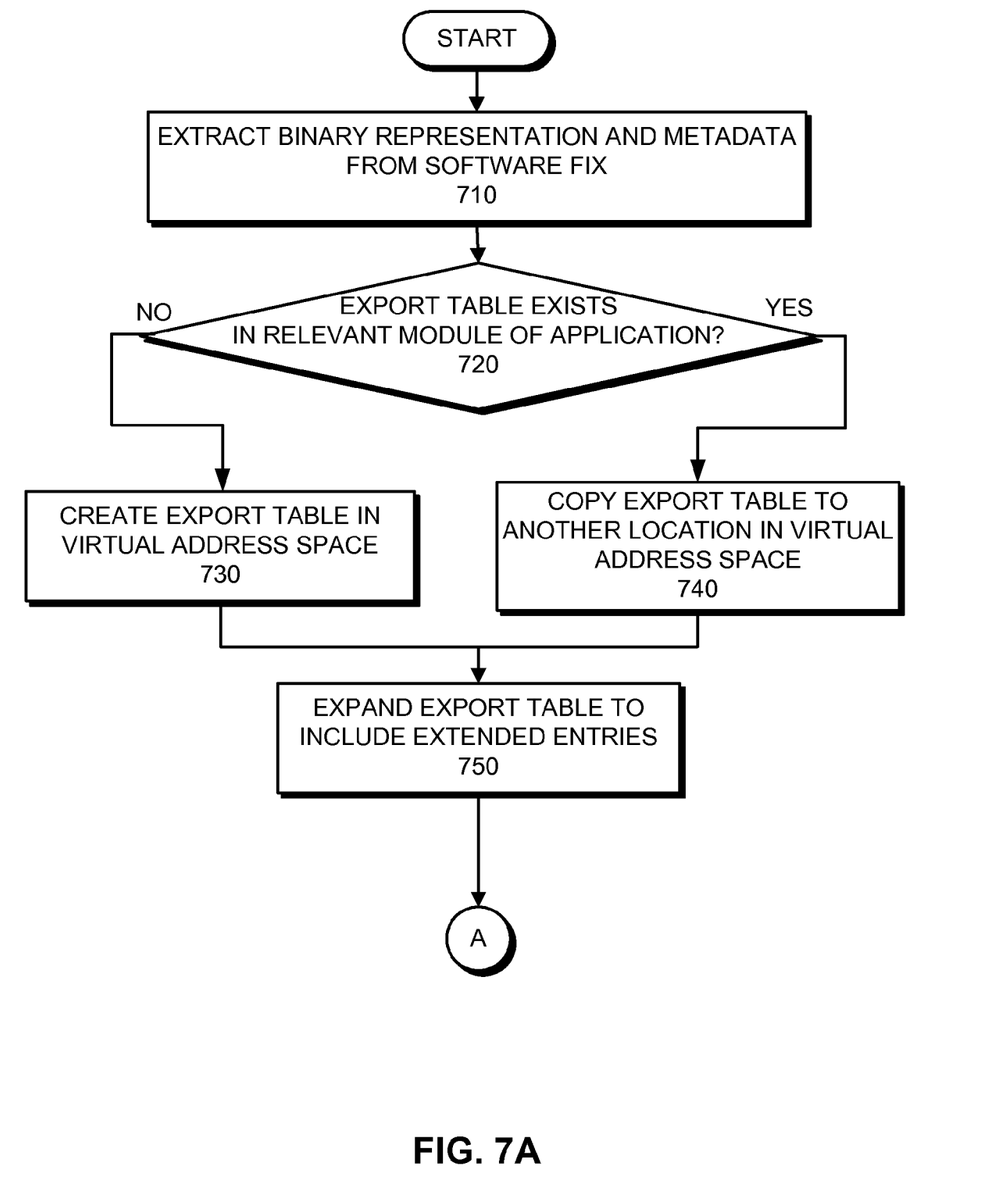
FIGS. 7A and 7B present flowcharts illustrating the process of applying a software fix, in accordance with one embodiment of the present disclosure.
Figure 7B:
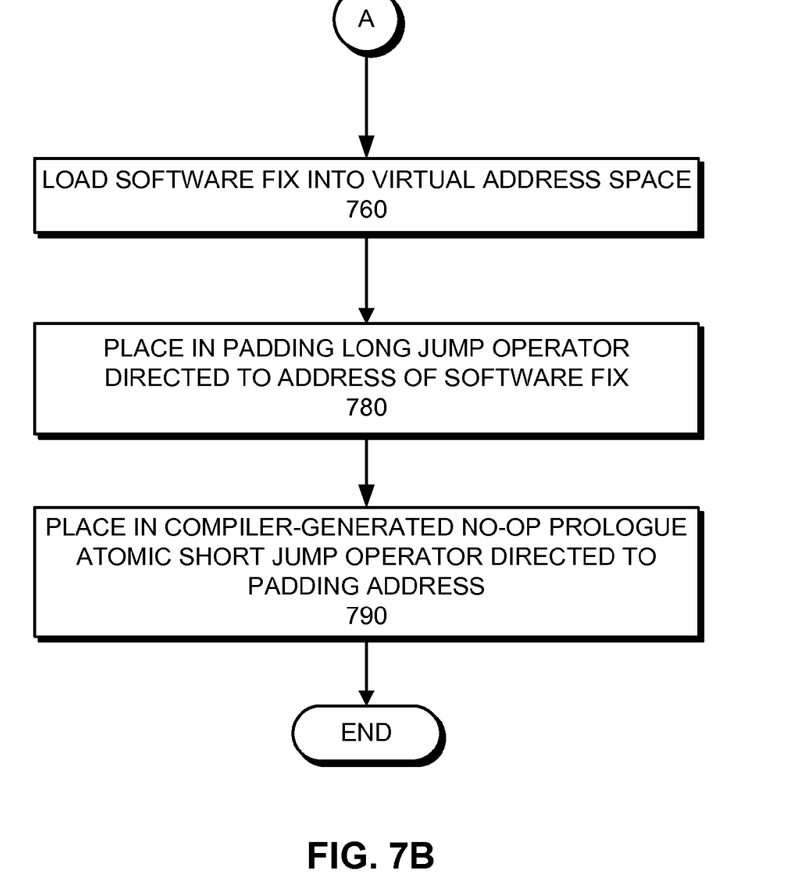

FIGS. 7A and 7B present flowcharts illustrating the process of applying a software fix, in accordance with one embodiment of the present disclosure. During operation, the system first extracts the binary representation and metadata from the software fix (operation 710). The system then determines whether an export table exists in the relevant executable module of the running application (operation 720). If no export table exists in the relevant executable module of the running application, the system creates an export table in the virtual memory space of the running software application (operation 730). If an export table already exists, the system copies the existing export table to another location in virtual address space (operation 740), and modifies the export table to include the extended export table entries (operation 750). The system then loads the software fix into the virtual memory address space of the running application (operation 760). In one embodiment, the custom TLS segment in the software fix is aliased to the corresponding virtual memory location of the TLS variables in the relevant executable module of the running application, by allowing the _tls_index variable in the software fix to have the same value as the _tls_index variable in the executable module of the running application. To enable the software fix, the system places in the padding in front of the fixed function a long jump operator directed to the location of the fixed function in the virtual memory address space (operation 780). The system next places in the compiler-generated no-operation prologue an atomic short jump operator that is directed to the location of the padding in the virtual memory address space (operation 790).

Removing Software Fix

Figure 8:
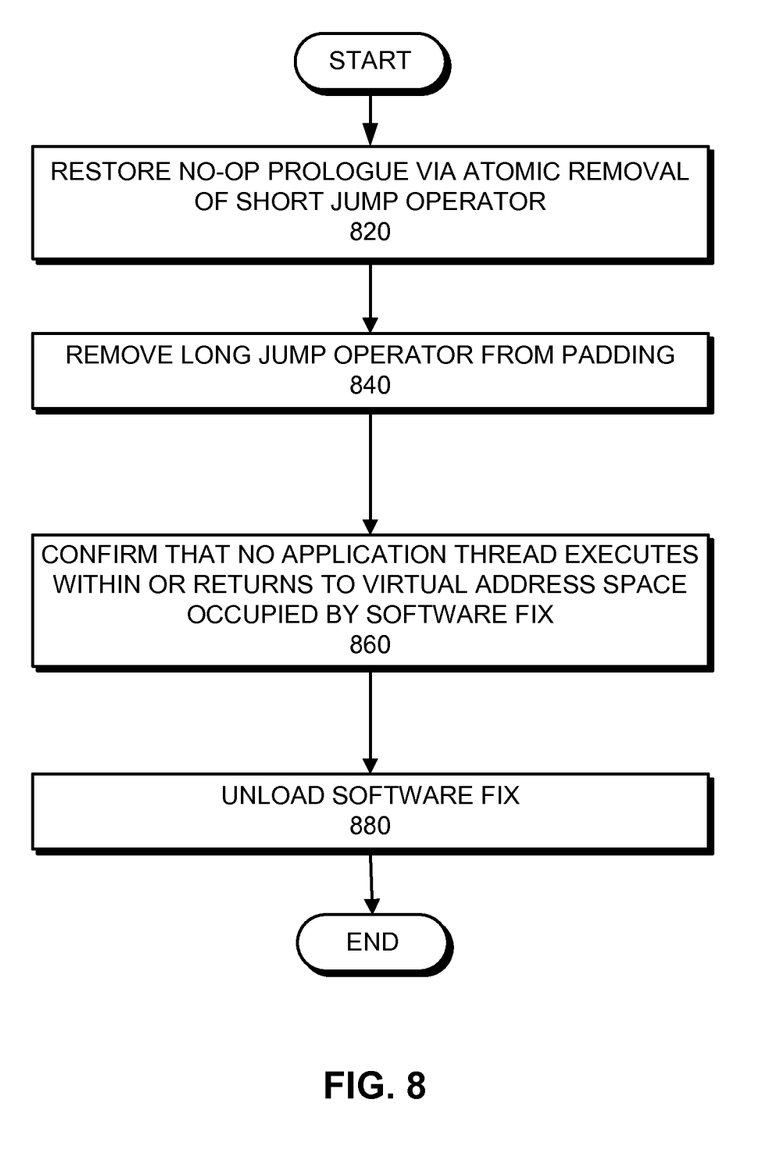
FIG. 8 presents a flowchart illustrating the process of removing a software fix, in accordance with one embodiment of the present disclosure.

FIG. 8 presents a flowchart illustrating the process of removing a software fix, in accordance with one embodiment of the present disclosure. To remove the software fix, the system restores the no-operation prologue by performing an atomic removal of the short jump operator (operation 820), and removes the long jump operator from the padding (operation 840). Next, the system examines logical gates at each entry and exit point to confirm that no application thread is executing within or returns to the virtual memory address space occupied by the software fix (operation 860). In another embodiment, a stack walk operation is performed for all running threads to ensure that no thread is executing in the address space occupied by the software fix. In response to the confirmation, the system unloads the software fix from the virtual memory address space of the running application without terminating or suspending the execution of the application (operation 880).

Software Fix Creation System

Figure 9:
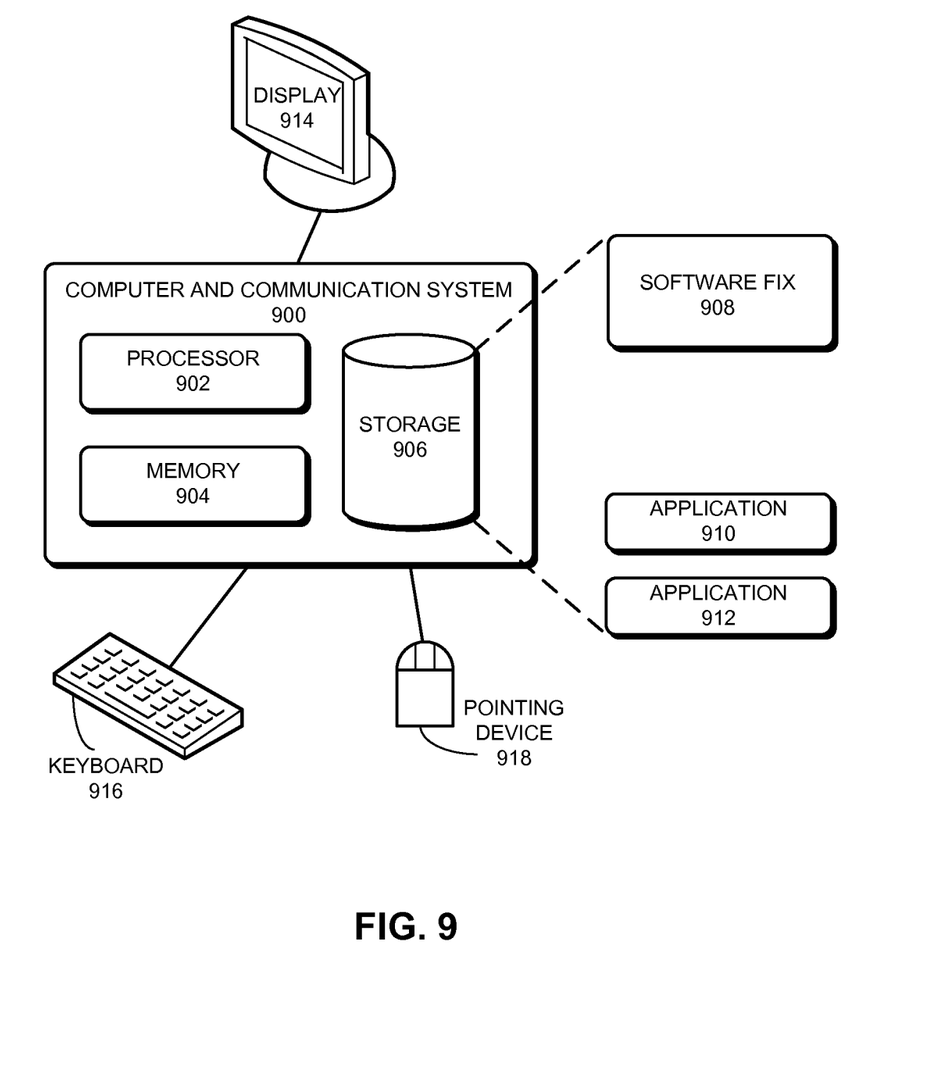
FIG. 9 presents a block diagram illustrating a system for creating, applying, and removing a software fix, in accordance with one embodiment of the present disclosure.

FIG. 9 presents a block diagram illustrating a system for creating, applying, and removing a software fix, in accordance with one embodiment of the present disclosure. In FIG. 9, a computer and communication system 900 includes a processor 902, a memory 904, and a storage device 906. Storage device 906 stores programs to be executed by processor 902. Specifically, storage device 906 stores software fix 908, as well as other applications, such as software applications 910 and 912. During operation, software fix 908 and software application 910 or 912 are loaded from storage device 906 into memory 904 and then executed by processor 902. While executing the program, processor 902 performs the aforementioned functions. Computer and communication system 900 is coupled to an optional display 914, keyboard 916, and pointing device 918.

The data structures and code described in this detailed description are typically stored on a non-transitory computer-readable storage medium, which may be any device that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, ASICs, FPGAs, and other programmable-logic devices now known or later developed. When the hardware modules are activated, the hardware modules perform the methods and processes included within the hardware modules.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A computer-executed method for creating a software fix for an application, the method comprising:
   selecting, from a plurality of source code sections associated with the application, a source code section that contains a software fix, and that includes an unresolved internal reference, wherein the unresolved internal reference in the source code section has a corresponding definition, wherein the corresponding definition is a variable;
   converting the unresolved internal reference in the source code section to an external imported reference by creating a new definition for the external imported reference by replacing the variable with a pointer to the variable as the new definition;
   automatically generating a header file which includes the new definition of the external imported reference;
   generating a binary representation for the fix by compiling the source code section containing the fix using the header file and linking the compiled code;
   and encapsulating the generated binary representation with metadata comprising information on how the application is to be modified to apply the software fix without being terminated.

2. The method of claim 1,
   wherein compiling the source code section comprises recognizing a thread-local storage (TLS) variable;
   and wherein the method further comprises:
      generating a new source file comprising a pragma section which defines a custom TLS segment;
      placing an entry associated with the TLS variable in the custom TLS segment at an offset that is identical to the offset associated with the corresponding TLS variable in a TLS segment in a binary code to be fixed;
      and compiling the new source file.

3. The method of claim 1, wherein the generated header file supersedes any other header file.

4. The method of claim 1,
   wherein encapsulating the generated binary representation further comprises encapsulating the generated binary representation with metadata in a secure format, and wherein the metadata further comprises information on how the application is to be modified to apply the software fix without being suspended.

5. The method of claim 1, further comprising compiling and linking only source code files containing the software fix.

6. A non-transitory computer-readable storage medium storing instructions which when executed by a computer cause the computer to perform a method for creating a software fix for an application, wherein the method comprises:
   selecting, from a plurality of source code sections associated with the application, a source code section that contains a software fix, and that includes an unresolved internal reference, wherein the unresolved internal reference in the source code section has a corresponding definition, wherein the corresponding definition is a variable;
   converting the unresolved internal reference in the source code section to an external imported reference by creating a new definition for the external imported reference by replacing the variable with a pointer to the variable as the new definition;
   automatically generating a header file which includes the new definition of the external imported reference;
   generating a binary representation for the fix by compiling the source code section containing the fix using the header file and linking the compiled code;
   and encapsulating the generated binary representation with metadata comprising information on how the application is to be modified to apply the software fix without being terminated.

7. The non-transitory computer-readable storage medium of claim 6, wherein compiling the source code section further comprises instantiating a Thread Local Storage (TLS) variable;

and the method further comprises:
generating a new source file comprising a pragma which defines a custom TLS segment;
placing an entry associated with the TLS variable in the custom TLS segment at an offset that is identical to the offset associated with the corresponding TLS variable in a TLS segment in the binary code to be fixed;
and compiling the new source file.

8. The non-transitory computer-readable storage medium of claim 6, wherein the generated header file supersedes any other header file.

9. The non-transitory computer-readable storage medium of claim 6, wherein encapsulating the generated binary representation further comprises encapsulating the generated binary representation with metadata in a secure format, and wherein the metadata further comprises information on how the application is to be modified to apply the software fix without being terminated or suspended.

10. An apparatus comprising:
a processor;
and a memory;
wherein the processor is configured to load instructions from the memory to perform a method comprising:
selecting, from a plurality of source code sections associated with the application, a source code section that contains a software fix, and that includes an unresolved internal reference, wherein the unresolved internal reference in the source code section has a corresponding definition, wherein the corresponding definition is a variable;
converting the unresolved internal reference in the source code section to an external imported reference by creating a new definition for the external imported reference by replacing the variable with a pointer to the variable as the new definition;
automatically generating a header file which includes the new definition of the external imported reference;
generating a binary representation for the fix by compiling the source code section containing the fix using the header file and linking the compiled code;
and encapsulating the generated binary representation with metadata comprising information on how the application is to be modified to apply the software fix without being terminated.

11. The apparatus of claim 10,
wherein compiling the source code section comprises recognizing a thread-local storage (TLS) variable;
and wherein the method further comprises:
generating a new source file comprising a pragma section which defines a custom TLS segment;
placing an entry associated with the TLS variable in the custom TLS segment at an offset that is identical to the offset associated with the corresponding TLS variable in a TLS segment in a binary code to be fixed;
and compiling the new source file.

12. The apparatus of claim 10, wherein the generated header file supersedes any other header file.

13. The apparatus of claim 10,
wherein encapsulating the generated binary representation further comprises encapsulating the generated binary representation with metadata in a secure format, and wherein the metadata further comprises information on how the application is to be modified to apply the software fix without being suspended.

* * * * *